(12) United States Patent
Cao et al.

(10) Patent No.: US 11,282,519 B2
(45) Date of Patent: Mar. 22, 2022

(54) VOICE INTERACTION METHOD, DEVICE AND COMPUTER READABLE STORAGE MEDIUM

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventors: Yushu Cao, Beijing (CN); Qing Si, Beijing (CN); Qinglong He, Beijing (CN); Xiangdong Xue, Beijing (CN)

(73) Assignees: BAIDU ONLINE NETWORK TECHNOLOGY (BEIJING) CO., LTD.; SHANGHAI XIAODU TECHNOLOGY CO. LTD.

( * ) Notice: Subject to any disclaimer, the term of this patent is extended or adjusted under 35 U.S.C. 154(b) by 213 days.

(21) Appl. No.: 16/508,453

(22) Filed: Jul. 11, 2019

(65) Prior Publication Data
US 2019/0333513 A1    Oct. 31, 2019

(30) Foreign Application Priority Data
Sep. 30, 2018    (CN) .......................... 201811159559.3

(51) Int. Cl.
*G10L 15/22*    (2006.01)
*G06F 16/683*    (2019.01)
(Continued)

(52) U.S. Cl.
CPC ............ *G10L 15/22* (2013.01); *G06F 16/683* (2019.01); *G10L 15/30* (2013.01); *G10L 2015/223* (2013.01); *H04L 67/42* (2013.01)

(58) Field of Classification Search
USPC ...................................................... 704/1–504
See application file for complete search history.

(56) References Cited

U.S. PATENT DOCUMENTS

| 6,349,290 B1 * | 2/2002 | Horowitz | ............. | G06Q 20/108 |
| | | | | 705/35 |
| 6,640,145 B2 * | 10/2003 | Hoffberg | ............. | G05B 19/0426 |
| | | | | 700/17 |

(Continued)

FOREIGN PATENT DOCUMENTS

| CN | 105227656 A | 1/2016 |
| CN | 107105322 A | 8/2017 |

(Continued)

OTHER PUBLICATIONS

First Office Action issued in Japanese Patent Application No. 2019132233 dated Apr. 7, 2020.

(Continued)

*Primary Examiner* — Marcus T Riley
(74) *Attorney, Agent, or Firm* — Dilworth IP, LLC

(57) ABSTRACT

Embodiments of the present disclosure provide a voice interaction method, device, and a computer readable storage medium. Through a conversion of a terminal device from a near-filed voice interaction mode to a far-filed voice interaction mode, the terminal device is configured to perform the following operations when in the far-filed voice interaction mode: obtaining voice information of a user; obtaining, according to the voice information, target information required by the user from a server; and playing the target information in a voice manner, so that the terminal device can be turned into a smart speaker with a screen in the far-field voice interaction mode, and into a common mobile phone or tablet computer in the near-field voice interaction mode. The terminal device provides the user with a flexible and convenient voice service.

16 Claims, 8 Drawing Sheets

(51) Int. Cl.
  *G10L 15/30* (2013.01)
  *H04L 67/01* (2022.01)

(56) References Cited

U.S. PATENT DOCUMENTS

| | | | |
|---|---|---|---|
| 7,006,881 B1* | 2/2006 | Hoffberg | G05B 15/02 |
| | | | 700/17 |
| 7,904,187 B2* | 3/2011 | Hoffberg | H04N 21/4532 |
| | | | 700/83 |
| 10,228,903 B2* | 3/2019 | Kang | H04W 12/04 |
| 2009/0286541 A1 | 11/2009 | Maheshwari et al. | |
| 2013/0212478 A1* | 8/2013 | Karr | G06F 3/167 |
| | | | 715/727 |
| 2015/0026580 A1* | 1/2015 | Kang | H04W 12/04 |
| | | | 715/728 |
| 2015/0110263 A1* | 4/2015 | Johnston | H04R 1/1041 |
| | | | 379/430 |
| 2017/0236510 A1* | 8/2017 | Fu | G10L 15/22 |
| | | | 704/251 |
| 2019/0333513 A1* | 10/2019 | Cao | H04L 67/26 |

FOREIGN PATENT DOCUMENTS

| | | |
|---|---|---|
| CN | 108038737 A | 5/2018 |
| CN | 108039172 A | 5/2018 |
| CN | 108428452 A | 8/2018 |
| JP | 2000069141 A | 3/2000 |
| JP | 2001345929 A | 12/2001 |
| JP | 2004282332 A | 10/2004 |
| JP | 20144010449 A | 1/2014 |
| JP | 2017016683 A | 1/2017 |

OTHER PUBLICATIONS

First Office Action in CN Patent Application No. 201811159559.3 dated Oct. 23, 2020.
First Office Action in JP Patent Application No. 2019132233 dated Oct. 23, 2020.

* cited by examiner

VOICE INTERACTION METHOD, DEVICE AND COMPUTER READABLE STORAGE MEDIUM

CROSS-REFERENCE TO RELATED APPLICATION

This application claims priority to Chinese Patent Application No. 201811159559.3, filed on Sep. 30, 2018, which is hereby incorporated by reference in its entirety.

TECHNICAL FIELD

Embodiments of the present disclosure relate to the field of computer technologies and, in particular, to a voice interaction method, device, and a computer readable storage medium.

BACKGROUND

With explosion of artificial intelligence technologies and gradual maturity of voice technologies, a human-like dialogue interaction based on dialogue flows has become a new type of interaction innovation. The mainstream interaction mode for smart devices is transforming from the touch interaction mode to the touch and dialogue-based interaction mode.

Currently, smart speakers have become a tool for users to access the Internet. The users can request songs, shop online, or get knowledge of weather conditions via the smart speakers. However, the smart speakers are heavy, which the users cannot carry around and are ready to use at any time. Thus, they cannot provide flexible and convenient voice services for the users.

SUMMARY

Embodiments of the present disclosure provide a voice interaction method, device, and a computer readable storage medium for providing a user with a flexible and convenient voice service.

In a first aspect, an embodiment of the present disclosure provides a voice interaction method, including:
  obtaining a mode control command;
  converting a terminal device from a first mode to a second mode according to the mode control command;
  obtaining voice information of a user when the terminal device is in the second mode;
  obtaining, according to the voice information, target information required by the user from a server; and
  playing audio information corresponding to the target information.

In a second aspect, an embodiment of the present disclosure provides a voice interaction method, including:
  obtaining a current voice interaction mode of a terminal device, where the terminal device includes a first mode and a second mode;
  if the terminal device is in the second mode, determining, according to voice information of a user transmitted by the terminal device, target information required by the user; and
  transmitting the target information to the terminal device so that the terminal device plays audio information corresponding to the target information.

In a third aspect, an embodiment of the present disclosure provides a terminal device, including:
  a memory;
  a processor; and
  a computer program;
  where the computer program is stored in the memory and configured to cause the processor to perform operations of:
    obtaining a mode control command;
    converting a terminal device from a first mode to a second mode according to the mode control command;
    obtaining voice information of a user when the terminal device is in the second mode;
    obtaining, according to the voice information, target information required by the user from a server; and
    playing audio information corresponding to the target information.

In a fourth aspect, an embodiment of the present disclosure provides a server, including:
  a memory;
  a processor;
  a communication interface; and
  a computer program;
  where the computer program is stored in the memory and configured to cause the processor to perform operations of:
    obtaining a current voice interaction mode of a terminal device, where the terminal device includes a first mode and a second mode;
    if the terminal device is in the second mode, determining, according to voice information of a user transmitted by the terminal device, target information required by the user; and
    transmitting the target information to the terminal device via the communication interface so that the terminal device plays audio information corresponding to the target information.

In a fifth aspect, an embodiment of the present disclosure provides a computer readable storage medium having a computer program stored thereon, where the computer program is executed by a processor to implement a method according to the first aspect or the second aspect.

In a sixth aspect, an embodiment of the present disclosure provides a terminal device, including:
  a first obtaining module, configured to obtain a mode control command;
  a mode converting module, configured to convert a terminal device from a first mode to a second mode according to the mode control command;
  a second obtaining module, configured to obtain voice information of a user when the terminal device is in the second mode;
  a third obtaining module, configured to obtain, according to the voice information, target information required by the user from a server; and
  a playing module, configured to play audio information corresponding to the target information.

In a seventh aspect, an embodiment of the present disclosure provides a server, including:
  an obtaining module, configured to obtain a current voice interaction mode of a terminal device, where the terminal device includes a first mode and a second mode;
  a determining module, configured to: when the terminal device is in the second mode, determine, according to voice information of a user transmitted by the terminal device, target information required by the user; and
  a transmitting module, configured to transmit the target information to the terminal device so that the terminal device plays audio information corresponding to the target information.

According to a voice interaction method, device, and a computer readable storage medium provided in embodiments of the present disclosure, through a conversion of a terminal device from a near-filed voice interaction mode to a far-filed voice interaction mode, the terminal device is configured to perform the following operations when in the far-filed voice interaction mode: obtaining voice information of a user; obtaining, according to the voice information, target information required by the user from a server; and playing the target information in a voice manner, so that the terminal device, i.e. a user terminal such as a mobile phone or a tablet computer, can be turned into a smart speaker with a screen in the far-field voice interaction mode, and into a common mobile phone or tablet computer in the near-field voice interaction mode. The terminal device is convenient for the user to carry, and the user can use a far-field voice interaction function of the terminal device anytime and anywhere, thereby providing the user with a flexible and convenient voice service.

BRIEF DESCRIPTION OF DRAWING(S)

Specific embodiments of the present disclosure have been described in the above drawings, for which more detailed descriptions will be made later. These drawings and text descriptions are not intended to limit the scope of the present disclosure in any way, but to explain concepts of the present disclosure to persons skilled in the art with reference to the specific embodiments.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless otherwise indicated. Implementations described in the following exemplary embodiments do not represent all implementations consistent with the present disclosure. Instead, they are merely examples of devices and methods that are consistent with some aspects of the present disclosure as detailed in the appended claims.

Figure 1:
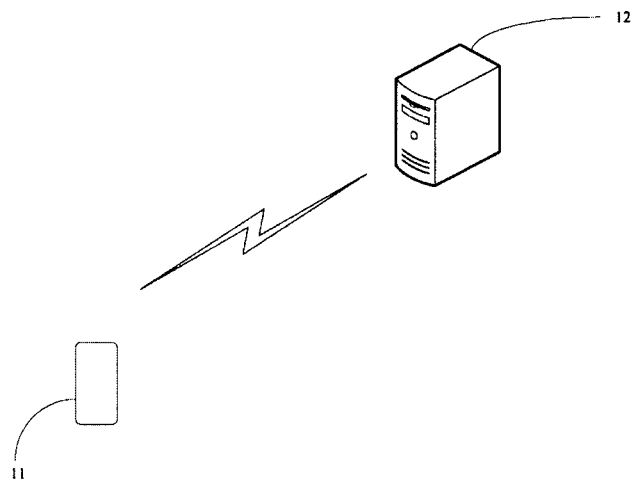
FIG. 1 is a schematic diagram of an application scenario according to an embodiment of the present disclosure.

The voice interaction method provided in the present disclosure can be applied to a communication system shown in FIG. 1. As shown in FIG. 1, the communication system includes a terminal device 11 and a server 12. The terminal device 11 can be specifically a user terminal such as a mobile phone or a tablet computer.

The voice interaction method provided in the present disclosure aims to solve the above technical problem of the prior art.

Technical solutions of the present disclosure and how the above technical problem is solved by the technical solutions of the present application will be described hereunder in detail with reference to specific embodiments. The following specific embodiments may be combined with each other, and for the same or similar concepts or processes, details may be omitted in some embodiments. The embodiments of the present disclosure will be described hereunder with reference to the accompanying drawings.

Figure 2:
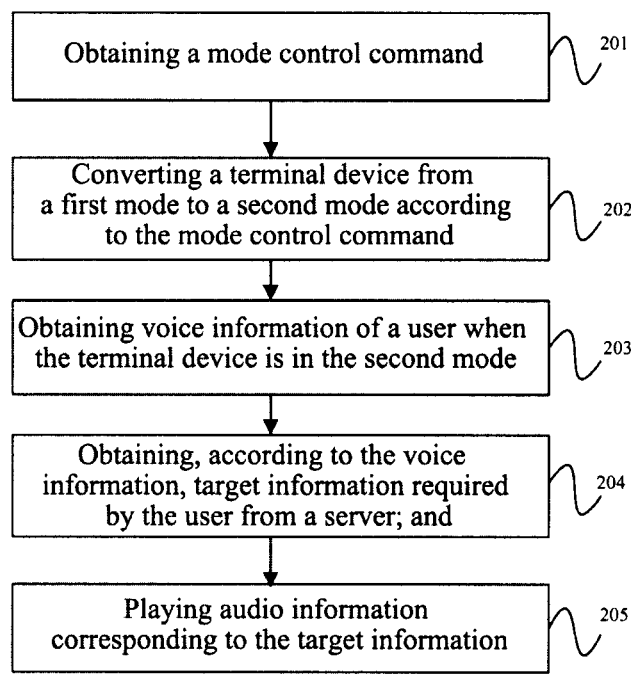
FIG. 2 is a flowchart of a voice interaction method according to an embodiment of the present disclosure.

FIG. 2 is a flowchart of a voice interaction method according to an embodiment of the present disclosure. The embodiment of the present disclosure provides a voice interaction method for the above technical problem in the prior art, where the method has specific steps as follows:

Step 201, obtaining a mode control command.

Figure 3:
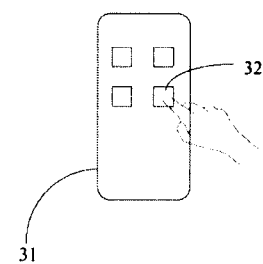
FIG. 3 is a schematic diagram of another application scenario according to an embodiment of the present disclosure.

The executor of the voice interaction method described in the present embodiment may be a terminal device which may be a user terminal such as a mobile phone or a tablet computer. As shown in FIG. 3, the terminal device 31 supports both a first mode and a second mode, where the first mode may be the original working mode of the user terminal such as the mobile phone or the tablet computer, and the second mode refers to a working mode in which the user terminal such as the mobile phone or the tablet computer has a smart speaker function after the user terminal is connected to an external device. In the present embodiment, the first mode includes a near-field voice interaction mode, and the second mode includes a far-field voice interaction mode. The so-called near-field voice interaction mode means that a user performs a voice interaction within a relatively short range apart from the terminal device 31. For instance, if a user is apart from the terminal device 31 by 0.5 meters, the terminal device 31 may identify information on voices produced by the user in various directions. The so-called far-field voice interaction mode means that a user may perform a voice interaction within a relatively large range apart from the terminal device 31. For instance, a user performs a voice interaction with the terminal device 31 within a range of 3-5 meters apart from the terminal device 31. In the present embodiment, the user may control the terminal device 31 to switch from the near-field voice interaction mode to the far-field voice interaction mode, or control the terminal device 31 to switch from the far-field voice interaction mode to the near-field voice interaction mode. Here, an example is taken by switching the terminal device 31 from the near-field voice interaction mode to the far-field voice interaction mode. A specific switching mode may be that the terminal device 31 obtains a mode control command, according to which the terminal device 31 is switched from the near-field voice interaction mode to the far-field voice interaction mode.

Optionally, the obtaining the mode control command includes the following feasible implementations:

A feasible implementation is to detect an operation from the user on an application in the terminal device, and generate the mode control command according to the operation.

As shown in FIG. 3, the terminal device 31 is installed with multiple applications, and icons of the multiple applications are displayed on a user interface of the terminal device 31, where one of the applications 32 may be used to control the terminal device 31 to switch from the near-field voice interaction mode to the far-field voice interaction mode, and the application 32 may be specifically an application for user setup of the terminal device 31. After clicking into the application 32, the user selects a corresponding voice interaction mode for setup, for instance, a function button for the far-field voice interaction mode is enabled, or a function button for the near-field voice interaction mode is disabled. After the terminal device 31 detects the operation from the user on the application 32 and the setting operation from the user on the far-field voice interaction mode, a mode control command will be generated according to the user's operation.

Another feasible implementation is to detect whether the terminal device is connected to an external device, and generate the mode control command if the terminal device is connected to the external device.

For instance, the terminal device 31 can also be connected to various types of external devices. Optionally, the external device includes at least one of: a charging base, a speaker, a headphone, and a mobile phone holder. Here is only a schematic illustration, which is not intended to limit a specific type of the external device, nor a mode of connection between the terminal device 31 and the external device. Optionally, the terminal device 31 and the external device are connected by a wired connection such as a Universal Serial Bus (USB) interface, an audio interface of 3.5 mm, a Lighting interface, and the like; or the terminal device 31 and the external device are connected by a wireless connection such as Bluetooth, Wireless-Fidelity (wifi), and the like.

Figure 4:
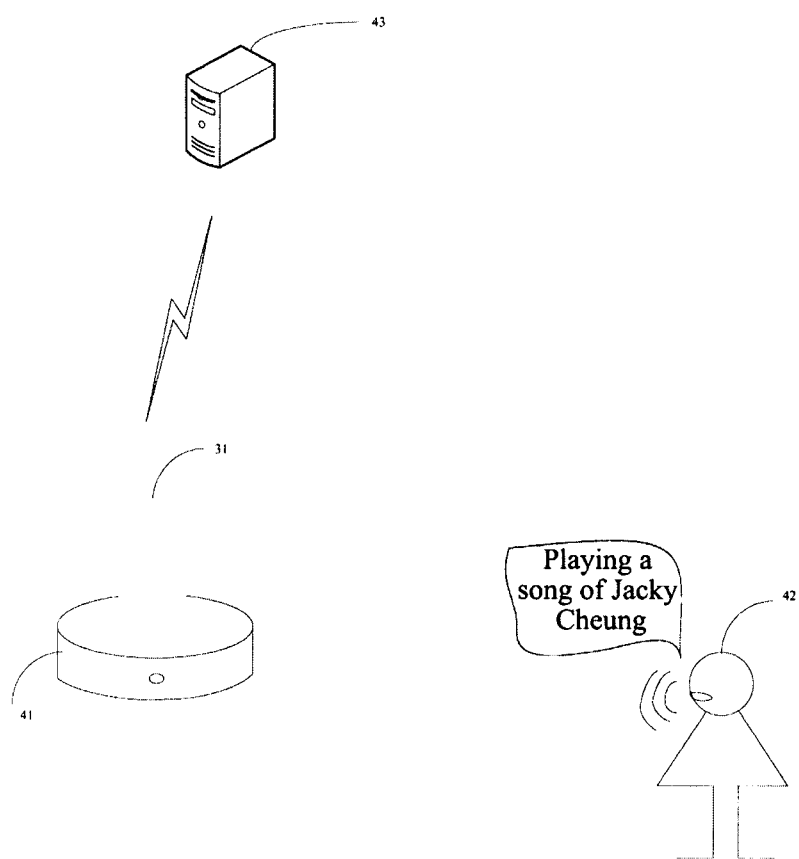
FIG. 4 is a schematic diagram of another application scenario according to an embodiment of the present disclosure.

As shown in FIG. 4, when the terminal device 31 is connected to the charging base 41, the terminal device 31 may be triggered to switch from the near-field voice interaction mode to the far-field voice interaction mode. Specifically, the terminal device 31 detects in real time whether the terminal device 31 is connected to an external device such as the charging base 41. When the terminal device 31 detects that the terminal device 31 is connected to the charging base 41, the mode control command is generated.

Step 202, converting a terminal device from a first mode to a second mode according to the mode control command.

Specifically, the terminal device 31 switches itself from the near-field voice interaction mode to the far-field voice interaction mode according to the mode control command. In the far-field voice interaction mode, a user may perform a voice interaction with the terminal device 31 within a relatively large range. That is to say, when the terminal device 31 is in the near-field voice interaction mode, the terminal device 31 implements a function of the original mobile phone or tablet computer. When the terminal device 31 is in the far-field voice interactive mode, the terminal device 31 may implement a function of the smart speaker.

Optionally, the terminal device includes a near-field voice channel and a far-field voice channel; and the converting the terminal device from the first mode to the second mode includes: deactivating the near-field voice channel, and activating the far-field voice channel.

In the present embodiment, the terminal device 31 is provided, on its driver layer, with a near-field voice channel and a far-field voice channel which are mutually isolated and independent voice channels. When the terminal device 31 is in the near-field voice interaction mode, the terminal device 31 processes voice information via the near-field voice channel. When the terminal device 31 is in the far-field voice interaction mode, the terminal device 31 processes voice information via the far-field voice channel. In the present embodiment, the far-field voice channel may support linear 2mic, 4mic, or 6mic voice information processing. When the user sets in the user interface that the terminal device 31 is switched from the near-field voice interaction mode to the far-field voice interaction mode, the driver layer of the terminal device 31 may specifically deactivate the near-field voice channel and activate the far-field voice channel. Alternatively, when the terminal device 31 is connected to an external device to trigger the terminal device 31 to switch from the near-field voice interaction mode to the far-field voice interaction mode, the driver layer of the terminal device 31 may specifically deactivate the near-field voice channel and activate the far-field voice channel.

Step 203, obtaining voice information of a user when the terminal device is in the second mode.

As shown in FIG. 3, when the terminal device 31 is in the far-field voice interaction mode, the terminal device 31 may collect the voice information of the user in real time, and process the voice information via the far-field voice channel.

Optionally, the obtaining the voice information of the user includes: collecting the voice information of the user via the external device.

As shown in FIG. 4, when the terminal device 31 is connected to an external device such as a charging base, if the charging base is equipped with a microphone, the voice information of the user may be collected via the microphone of the charging base, and the voice information of the user is then transmitted to the terminal device 31 by the charging base.

Step 204, obtaining, according to the voice information, target information required by the user from a server.

After the terminal device 31 obtains voice information of the user, the voice information may be transmitted to a remote server which performs a semantic analysis to determine the target information required by the user. For instance, if the voice information collected by the terminal device 31 is: "Playing a song of Jacky Cheung", after the terminal device 31 transmits the voice information to the remote server, the remote server determines that the target information required by the user is musical audio information, and a satisfied condition for such audio information is that the singer is Jacky Cheung. The remote server obtains, from the database, audio information satisfying the requirement, and transmits the audio information to the terminal device 31.

In other embodiments, the obtaining, according to the voice information, the target information required by the user from the server includes: processing the voice information via the far-field voice channel and determining the target information required by the user; and obtaining the target information required by the user from the server.

As shown in FIG. 4, the terminal device 31 is connected to the charging base 41; the terminal device 31 enters the far-field voice interaction mode; the user 42 says "Playing a song of Jacky Cheung" at a location far from the terminal device 31; the charging base 41 collects voice information of the user 42, and transmits the voice information to the terminal device 31; the terminal device 31 processes the voice information via the far-field voice channel, and determines that the target information required by the user is musical audio information, where a satisfied condition for such audio information is that the singer is Jacky Cheung; then the terminal device 31 may transmit feature information corresponding to the target information, such as audio information, singer Jacky Cheung and the like to the remote server 43; and the remote server 43 obtains, from the database, target information satisfying the requirements, and transmits the target information to the terminal device 31.

Step 205, playing audio information corresponding to the target information.

After receiving the target information delivered by the remote server 43, the terminal device 31 plays the audio information corresponding to the target information. For instance, play a song of Jacky Cheung.

Optionally, the playing the audio information corresponding to the target information includes: playing the audio information corresponding to the target information via the external device.

As shown in FIG. 4, the charging base 41 may be further equipped with a speaker. When the terminal device 31 receives audio information required by the user, such as music delivered by the remote server 43, the terminal device 13 may play the music via the charging base 41, e.g. a song of Jacky Cheung.

It should be understood that, here is only a schematic illustration, which does not limit specific content of voice interaction between the user and the terminal device, nor a specific format of the target information delivered by the remote server 43. The target information may be specifically at least one of: text information, audio information, video information and image information. For instance, as shown in FIG. 4, the user 42 says within a relatively large range, "How is the weather today?", after detecting voice information of the user, the terminal device 13 transmits the voice information to the remote server 43; the remote server 43 determines weather information about the user's current location according to the user's location, and delivers the weather information to the terminal device 13; the terminal device 13 can also display the weather information textually on the screen of the terminal device 13 while playing the weather information. For another example, the remote server 43 may also control a smart home system in the user's home. For instance, the light in the living room of the user belongs to a smart home system in the Internet of Things. As shown in FIG. 4, the user 42 says within a relatively large range: "Turn on the light in the living room"; after detecting voice information of the user, the terminal device 13 transmits the voice information to the remote server 43; the remote server 43 generates, according to the voice information, a control command for controlling the light, and transmits, over the Internet of Things, the control command to the light in the user's living room to control the light in the user's living room to be turned on.

Figure 5:
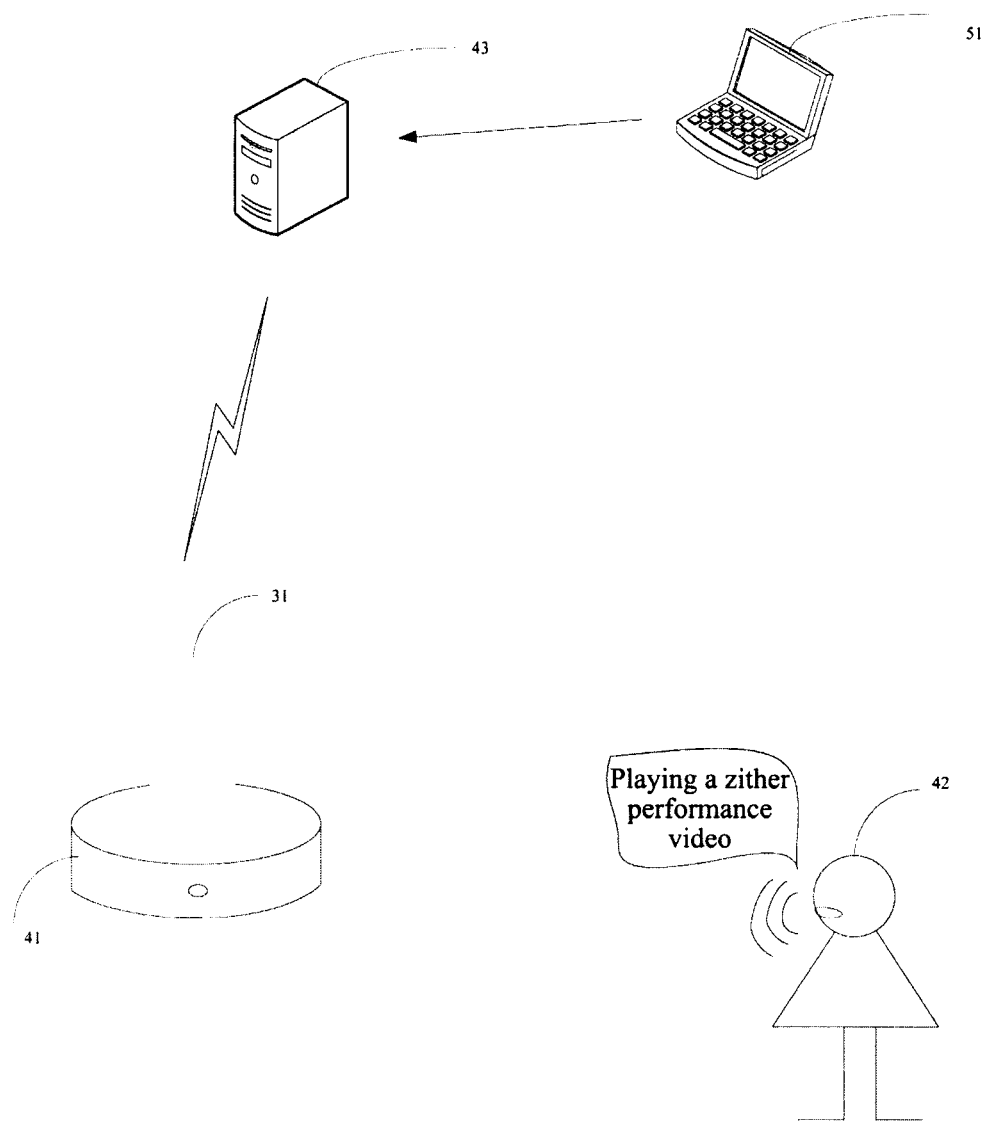
FIG. 5 is a schematic diagram of another application scenario according to an embodiment of the present disclosure.
Figure 6:
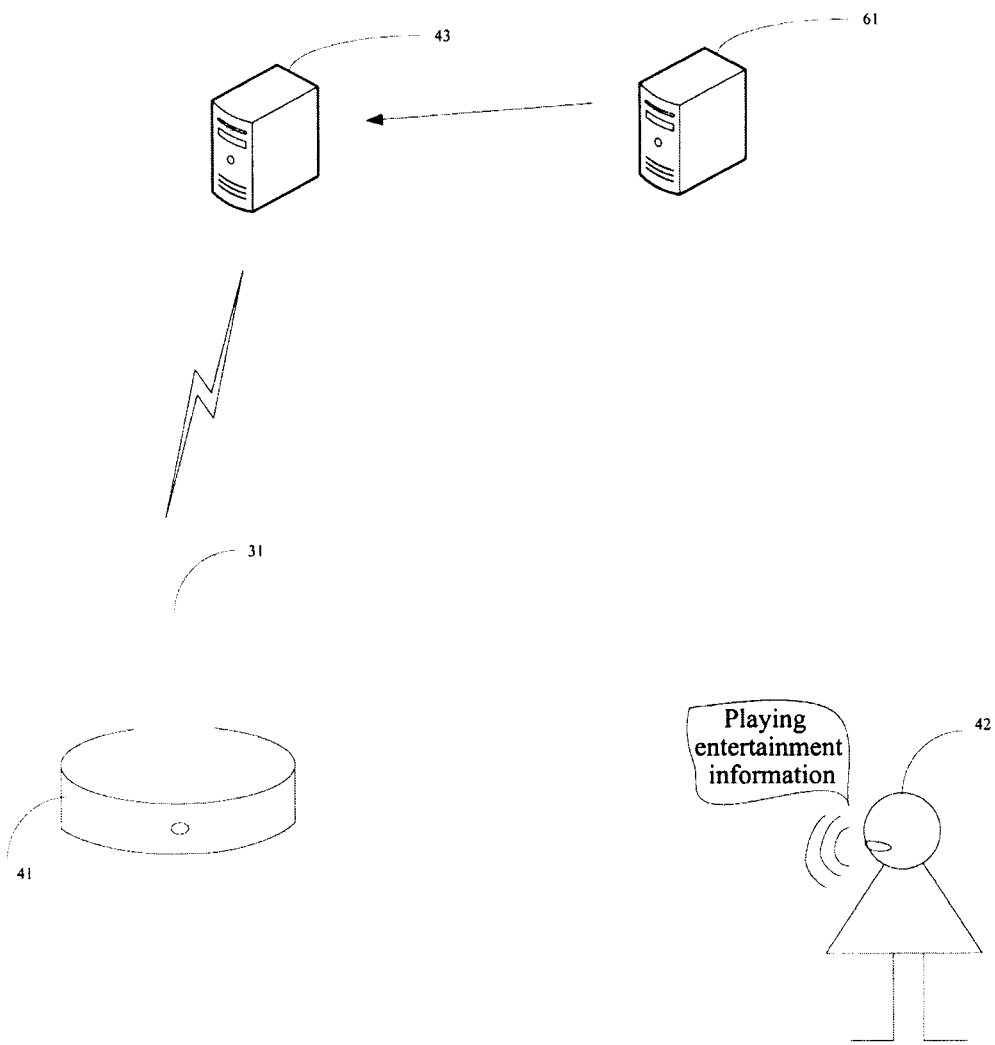
FIG. 6 is a schematic diagram of another application scenario according to an embodiment of the present disclosure.

In other embodiments, the remote server 43 may also receive media information provided by a third party server or a further terminal device. As shown in FIG. 5, the terminal devices 51 of a further user may transmit locally stored or recorded media information such as a zither performance video to the remote server 43, and the remote server 43 may store the media information into the database. For instance, the user 42 says to the terminal device 13 that "Playing a zither performance video"; the terminal device 13 transmits the voice information to the remote server 43; the remote server 43 may transmit to the terminal device 13 the zither performance video received from the terminal device 51; and the terminal device 13 plays the zither performance video. Alternatively, as shown in FIG. 6, the remote server 43 may also receive media information transmitted by the third party server 61. For instance, the third party server 61 transmits to the remote server 43 the latest entertainment information such as image information, video information, audio information and the like. The user 42 says to the terminal device 13 that "Playing entertainment information"; the terminal device 13 transmits the voice information to the remote server 43; the remote server 43 may transmit to the terminal device 13 the latest entertainment information received from the third party server 61; and the terminal device 13 plays the entertainment information. For instance, the terminal device 13 transmits the entertainment information to the charging base 41, and the entertainment information is played by a speaker of the charging base 41.

According to the embodiment of the present disclosure, through a conversion of a terminal device from a near-filed voice interaction mode to a far-filed voice interaction mode, the terminal device is configured to perform the following operations when in the far-filed voice interaction mode: obtaining voice information of a user; obtaining, according to the voice information, target information required by the user from a server; and playing the target information in a voice manner, so that the terminal device, i.e. a user terminal such as a mobile phone or a tablet computer, can be turned into a smart speaker with a screen in the far-field voice interaction mode, and into a common mobile phone or tablet computer in the near-field voice interaction mode. The terminal device is convenient for the user to carry, and the user can use a far-field voice interaction function of the terminal device anytime and anywhere, thereby providing the user with a flexible and convenient voice service.

Figure 7:
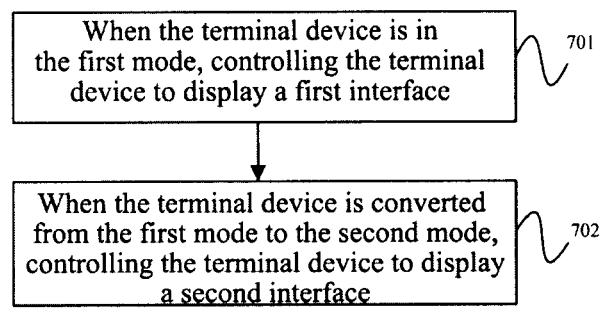
FIG. 7 is a flowchart of a voice interaction method according to another embodiment of the present disclosure.

FIG. 7 is a flowchart of a voice interaction method according to another embodiment of the present disclosure. Based on the foregoing embodiments, the voice interaction method provided in the present embodiment further includes the following steps:

Step 701, when the terminal device is in the first mode, controlling the terminal device to display a first interface.

Figure 8:
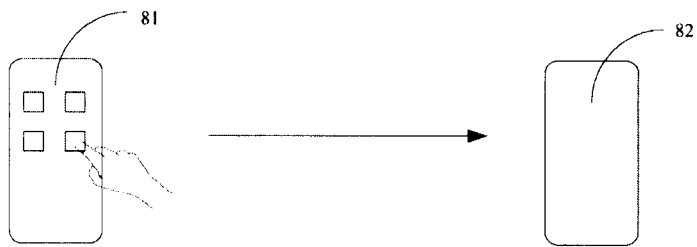
FIG. 8 is a schematic diagram showing page switching according to another embodiment of the present disclosure.

As shown in FIG. 8, when a terminal device is in the near-field voice interaction mode, the terminal device displays a first interface 81. The first interface 81 may be specifically an original system desktop of the terminal device, and icons of several different applications are displayed on the system desktop.

Step 702, when the terminal device is converted from the first mode to the second mode, controlling the terminal device to display a second interface.

As shown in FIG. 3, when the user clicks into the application 32 and enables a function button for the far-field voice interaction mode or disables a function button for the near-field voice interaction mode, the terminal device 31 is converted from the near-field voice interaction mode to the far-field voice interaction mode.

Alternatively, as shown in FIG. 4, when the terminal device 31 is connected to an external device, the terminal device 31 is triggered to convert from the near-field voice interaction mode to the far-field voice interaction mode.

In the present embodiment, when the terminal device 31 is switched from the near-field voice interaction mode to the far-field voice interaction mode, a second interface 82 is displayed on the screen of the terminal device 31. The second interface 82 may be a system desktop corresponding to the far-field voice interaction mode. Optionally, there is no icon for a third-party application in the second interface 82. The user performs an interaction with the terminal device 31 mainly via the voice interaction mode. Optionally, a button for exiting the far-field voice interaction mode may be displayed on the second interface 82. When the user clicks the button, the terminal device 31 is converted from the far-field voice interaction mode to the near-field voice interaction mode, and meanwhile the interface displayed by the terminal device 31 is switched from the second interface 82 to the first interface 81. Alternatively, as shown in FIG. 4, when the terminal device 13 is separated from the external device, the terminal device 31 is triggered to convert from the far-field voice interaction mode to the near-field voice interaction mode, and meanwhile the interface displayed by the terminal device 31 is switched from the second interface 82 to the first interface 81.

In the present embodiment, when the terminal device 31 is in the far-field voice interaction mode, the terminal device 13 may also identify voiceprint information of the user according to the voice information of the user when the terminal device 13 performs a voice interaction with the user. The voiceprint information can be used as identification information of the user. Optionally, the terminal device 13 may support use from multiple family members. Specifically, the terminal device 13 may be pre-stored with voiceprint information of each family member. When collecting voice information, the terminal device 13 first identifies voiceprint information corresponding to the voice information, and determines whether the voiceprint information is voiceprint information of a certain family member. If yes, the terminal device 13 further performs a voice interaction with the family member. In further, the terminal device 13 may also determine a role of the family member in the family according to the voiceprint information of the family member. If the terminal device 13 determines that the voiceprint information is voiceprint information of a child, the terminal device 13 may also enable a corresponding child mode, for instance, limiting the time the child uses the terminal device 13 for a voice interaction. If the terminal device 13 determines that the voiceprint information is voiceprint information of a family member having the maximum privilege, the terminal device 13 may also enable a corresponding permission mode, for instance, when other family members perform voice interactions with the terminal device 13, each time they need to say a keyword that can wake up the terminal device 13; while the family member with the maximum privilege performs a voice interaction with the terminal device 13, there is no need to say the keyword, instead only a user requirement is needed. For instance, the same case to play entertainment information, other family members need to say: "Xiaodu, Xiaodu, please play entertainment information", while the family member with the maximum privilege only needs to say: "Playing entertainment information", in which "Xiaodu, Xiaodu" is the keyword that wakes up the terminal device 13. It will be appreciated that the child mode and the permission mode described in the present embodiment are only some specific applications when the terminal device 13 is in the far-field voice interaction mode, but not modes in parallel with the far-field voice interaction mode.

The embodiment of the present disclosure allows for controlling the terminal device to display a first interface when the terminal device is in a near-field voice interaction mode, and controlling the terminal device to display a second interface when the terminal device is converted from the near-field voice interaction mode to the far-field voice interaction mode. In the second interface, the user is provided with a smart voice interaction experience.

Figure 9:
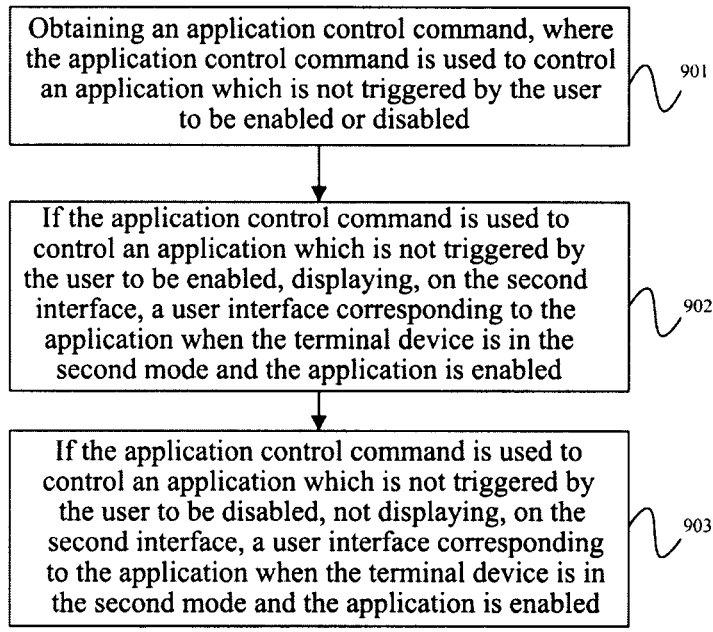
FIG. 9 is a flowchart of a voice interaction method according to another embodiment of the present disclosure.

FIG. 9 is a flowchart of a voice interaction method according to another embodiment of the present disclosure. It can be known from the foregoing embodiments that, the terminal device 31 can display the first interface 81 in the near-field voice interaction mode and display the second interface 82 in the far-field voice interaction mode, since icons of various applications are displayed on the first interface 81, when the terminal device 31 is in the near-field voice interaction mode, the terminal device 31 may display interaction interfaces of different applications. However, when the terminal device 31 is in the far-field voice interaction mode, whether the terminal device 31 can also display interaction interfaces of different applications, this can be implemented by the method described in the present embodiment. The voice interaction method provided in the present embodiment further includes the following steps:

Step 901, obtaining an application control command, where the application control command is used to control an application which is not triggered by the user to be enabled or disabled.

Optionally, when the terminal device 31 is in the near-field voice interaction mode, the user may control a manner in which an application in the terminal device 31 is enabled for disabled. For instance, the user may set that: when the terminal device 31 is in the far-field voice interaction mode, an application which is not triggered by the user may be enabled or disabled. A specific setting method is not limited herein, which may be a voice method or an application operation method. Optionally, after the user performs a corresponding setting, the terminal device 13 generates a corresponding application control command, for instance, the user sets that: when the terminal device 31 is in the far-field voice interaction mode, an application which is not triggered by the user may be enabled, the application control command is then used to control the application which is not triggered by the user to be enabled. If the user sets that: when the terminal device 31 is in the far-field voice interactive mode, an application which is not triggered by the user is disabled, the application control command is then used to control the application which is not triggered by the user to be disabled.

Step 902, if the application control command is used to control an application which is not triggered by the user to be enabled, displaying, on the second interface, a user interface corresponding to the application when the terminal device is in the second mode and the application is enabled.

For instance, if the application control command is used to control an application which is not triggered by the user to be enabled, the terminal device 31 displays the second interface 82 when the terminal device 31 is in the far-field voice interaction mode, at this point, if any application of the terminal device 31 in the near-field voice interaction mode, such as Wechat, receives an instant communication message, the terminal device 31 may display, on the second interface 82, prompt information corresponding to the instant communication message, such as a task bar, a notification bar, a pop-up or the like, when the user clicks the prompt information, the terminal device 31 may skip from the second interface 82 to the user interface WeChat.

Step 903, if the application control command is used to control an application which is not triggered by the user to be disabled, not displaying, on the second interface, a user interface corresponding to the application when the terminal device is in the second mode and the application is enabled.

For instance, if the application control command is used to control an application which is not triggered by the user to be disabled, the terminal device 31 displays the second interface 82 when the terminal device 31 is in the far-field voice interaction mode, at this point, if a certain application of the terminal device 31 in the near-field voice interaction mode, such as Wechat, receives an instant communication message, but no prompt information is displayed on the second interface 82, equivalently, when the terminal device 31 displays the second interface 82, the application in the near-field voice interaction mode may be masked.

In addition, in other embodiments, the user may also set a certain application so that only a task bar, a notification bar, a pop-up or the like corresponding to the application is displayed when the terminal device 31 is in the far-field voice interaction mode, but task bars, notification bars, pop-ups or the like corresponding to other applications are not displayed.

In the embodiment of the present disclosure, the user may control an application which is not triggered by the user to be enabled or disabled. If the user controls an application which is not triggered by the user to be enabled, an application of the terminal device 31 in the near-field voice interaction mode may be enabled when the terminal device is in the far-field voice interaction mode, and a task bar, a notification bar, a pop-up or the like corresponding to the application can be displayed on the screen, so that the user can receive a message of the application instantly. If the user controls an application which is not triggered by the user to be disabled, the application of the terminal device 31 in the near-field voice interaction mode cannot be enabled when the terminal device is in the far-field voice interaction mode, and a task bar, a notification bar, a pop-up or the like corresponding to the application is not displayed on the screen, preventing the user's voice interaction in the far-field voice interaction mode from being interrupted.

Figure 10:
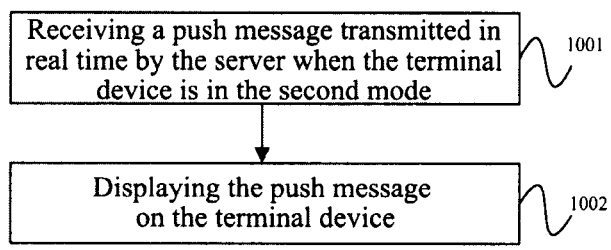
FIG. 10 is a flowchart of a voice interaction method according to another embodiment of the present disclosure.

FIG. 10 is a flowchart of a voice interaction method according to another embodiment of the present disclosure. Based on the foregoing embodiments, the voice interaction method provided in the present embodiment further includes the following steps:

Step 1001, receiving a push message transmitted in real time by the server when the terminal device is in the second mode.

In the present embodiment, when the terminal device is switched from the near-field voice interaction mode to the far-field voice interaction mode, that is, when the interface displayed by the terminal device is switched from the first interface 81 to the second interface 82 as shown in FIG. 8, a remote server transmits the push message to the terminal device in real time, where the push message may be randomly determined by the remote server, or may be generated by the remote server according to at least one of the latest real-time hotspot information, user history information, and a user portrait.

A specific form and quantity of the push message is not limited in the present embodiment. For instance, the push message may be at least one of text information, image information, video information, and audio information.

Step 1002, displaying the push message on the terminal device.

After the terminal device receives the push message delivered by the remote server, the push message is displayed on the second interface 82 in real time. For instance, the push message may be specifically a desktop background and text information. The remote server delivers different desktop backgrounds and text information each time. The text information may be real-time messages such as the latest hot news, weather information and news at the moment. Specifically, the terminal device may display the push messages in turn. In the process where the terminal device displays the push message in real time, if detecting voice information of the user, the terminal device transmits the voice information to a remote server according to the method described in the foregoing embodiments. The remote server determines target information required by the user, or the terminal device determines, according to the voice information, target information required by the user, and transmits a request message requesting acquisition of the target information to the remote server. When the terminal device receives the target information delivered by the remote server, the terminal device pauses displaying the foregoing push message and plays the target information. After the target information is played, the terminal device starts to display the paused push message again. In the present embodiment, the terminal device and the remote server may maintain a long network connection and obtain in real time the latest push message delivered by the remote server.

The embodiment of the present disclosure allows for receiving a push message transmitted by the server in real time and displaying the push message on the terminal device when the terminal device is in the far-field voice interaction mode, so that the user may not only perform a far-field voice interaction with the terminal device in the far-field voice interaction mode, but also browse in real time the push message transmitted by the server, helping the user to get knowledge of more network consultations.

Figure 11:
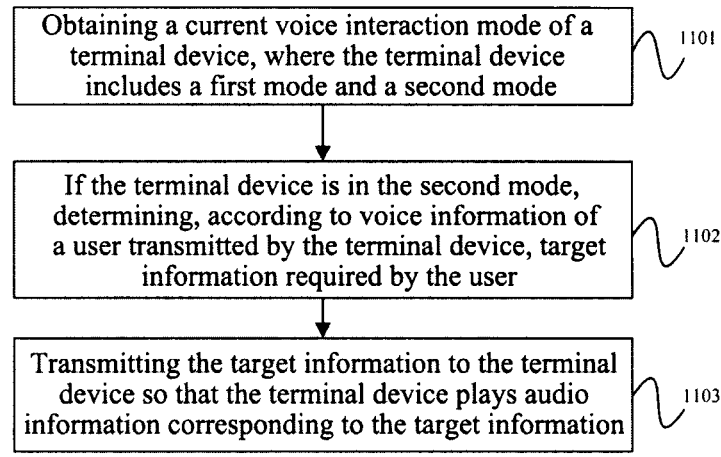
FIG. 11 is a flowchart of a voice interaction method according to an embodiment of the present disclosure.

FIG. 11 is a flowchart of a voice interaction method according to an embodiment of the present disclosure. The embodiment of the present disclosure provides a voice interaction method for the above technical problem in the prior art, and the method has specific steps as follows:

Step 1101, obtaining a current voice interaction mode of a terminal device, where the terminal device includes a first mode and a second mode.

Step 1102, if the terminal device is in the second mode, determining, according to voice information of a user transmitted by the terminal device, target information required by the user.

Step 1103, transmitting the target information to the terminal device so that the terminal device plays audio information corresponding to the target information.

The executor of the voice interaction method described in the present embodiment may be a server, where the server may be specifically the remote server described in the foregoing embodiments. Implementations and specific principles of the method described in the present embodiment are consistent with the foregoing embodiments, for which details will be omitted herein.

According to the embodiment of the present disclosure, through a conversion of a terminal device from a near-filed voice interaction mode to a far-filed voice interaction mode, the terminal device is configured to perform the following operations when in the far-filed voice interaction mode: obtaining voice information of a user; obtaining, according to the voice information, target information required by the user from a server; and playing the target information in a voice manner, so that the terminal device, i.e. a user terminal such as a mobile phone or a tablet computer, can be turned into a smart speaker with a screen in the far-field voice interaction mode, and into a common mobile phone or tablet computer in the near-field voice interaction mode. The terminal device is convenient for the user to carry, and the user can use a far-field voice interaction function of the terminal device anytime and anywhere, thereby providing the user with a flexible and convenient voice service.

Figure 12:
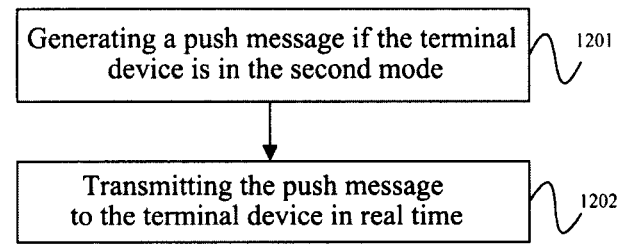
FIG. 12 is a flowchart of a voice interaction method according to another embodiment of the present disclosure.

FIG. 12 is a flowchart of a voice interaction method according to another embodiment of the present disclosure. Based on the foregoing embodiments, the voice interaction method provided in the present embodiment further includes the following steps:

Step 1201, generating a push message if the terminal device is in the second mode.

In the present embodiment, when the terminal device is switched from the near-field voice interaction mode to the far-field voice interaction mode, that is, when the interface displayed by the terminal device is switched from the first interface 81 to the second interface 82 as shown in FIG. 8, a remote server transmits the push message to the terminal device in real time, where the push message may be randomly determined by the remote server, or may be generated by the remote server according to at least one of the latest real-time hotspot information, user history information, and a user portrait.

Optionally, the generating the push message includes: generating the push message according to at least one of the latest real-time hotspot information, user history information, and a user portrait.

Optionally, the generating the push message according to at least one of the latest real-time hotspot information, the user history information, and the user portrait includes: predicting user behavior information according to the user history information; obtaining recommended contents according to the user behavior information; and determining the push message according to the recommended contents and the latest real-time hotspot information.

Optionally, the determining the push message according to the recommended contents and the latest real-time hotspot information includes: sorting the recommended contents and the latest real-time hotspot information, and obtaining a sorting result of the recommended contents and the latest real-time hotspot information; and determining the push message according to the sorting result.

Figure 13:
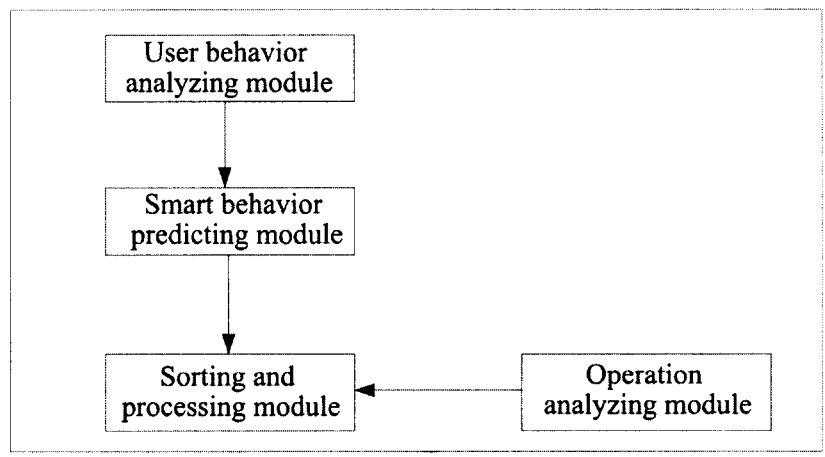
FIG. 13 is a schematic diagram showing functional modules in a remote server according to another embodiment of the present disclosure.

In the present embodiment, the remote server may include a user behavior analyzing module, a smart behavior predicting module, a sorting and processing module, and an operation analyzing module, as shown in FIG. 13, where the user behavior analyzing module is configured to analyze user history information, and the user history information may be specifically user history voice information, according to which target information applied by the user historically may be determined. In addition, after the terminal device 13 receives the target information delivered by the remote server, the terminal device 13 may also detect whether the user clicks and views the target information. If the user does not click and view the target information, the terminal device 13 may also transmit record information that the user does not click and view to the remote server. The user behavior analyzing module may determine which target information the user has played and which target information the user has not played. The user behavior analyzing module predicts user behavior information according to the target information played by the user and the target information that has not been played by the user, for instance, predicting an information type that the user is about to obtain, this information type is an exploration type, for instance. The user behavior analyzing module transmits its predicted user behavior information to the smart behavior predicting module. The smart behavior predicting module obtains recommended contents (such as multiple pieces of exploration-type video information, e.g., video information A, video information B, and video information C) from the database according to the information type such as the exploration type, at the same time, the smart behavior predicting module may further calculate respective weight coefficients of the video information A, the video information B, and the video information C. The weight coefficients may be determined by the smart behavior predicting module according to factors such as a video record browsed by the user and the number of times the video information is clicked. Further, the smart behavior predicting module transmits recommended contents, such as the video information A, the video information B and the video information C, together with weight coefficients corresponding to respective pieces of video information to the sorting and processing module. The sorting and processing module not only receives the video information A, the video information B, and the video information C transmitted by the smart behavior predicting module, but also receives the latest real-time hotspot information transmitted by the operation analyzing module and a weight coefficient corresponding to the latest real-time hotspot information. The sorting and processing module sorts the video information A, the video information B, the video information C, and the latest real-time hotspot information according to the weight coefficients. It will be appreciated that here is merely a schematic illustration, which does not limit the quantity of the latest real-time hotspot information transmitted by the operation analyzing module to the sorting and processing module. The remote server may deliver a push message to the terminal device according to a sorting result of the video information A, the video information B, the video information C, and the latest real-time hotspot information from the sorting and processing module. In one possible case, the remote server pushes the multiple pieces of information sequentially according to the sorting result. In another possible case, the remote server pushes information with a higher weight coefficient to the terminal device, where the weight coefficient is extracted from the sorting result.

Step 1202, transmitting the push message to the terminal device in real time.

The embodiment of the present disclosure allows the server to generate a push message according to at least one of the latest real-time hotspot information, user history information, and a user portrait, so that the push message is more greatly in line with the user's requirement, improving a user experience.

Figure 14:
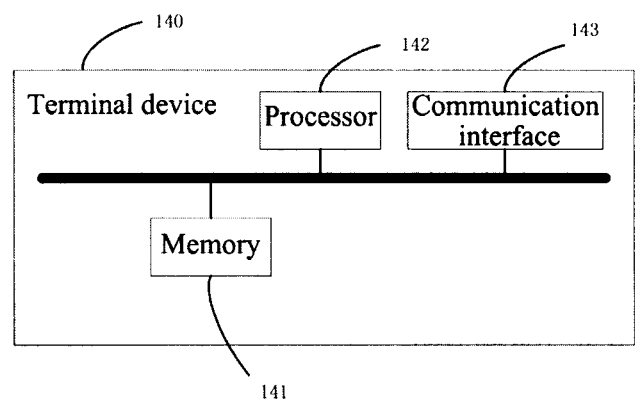
FIG. 14 is a schematic structural diagram of a terminal device according to an embodiment of the present disclosure.

FIG. 14 is a schematic structural diagram of a terminal device according to an embodiment of the present disclosure. The terminal device provided in the embodiment of the present disclosure may perform a process flow provided in a voice interaction method embodiment. As shown in FIG. 14, the terminal device 140 includes: a memory 141, a processor 142, a computer program, and a communication interface 143; a memory; where the computer program is stored in the memory 141 and configured to cause the processor 142 to perform operations of: obtaining a mode control command; converting a terminal device from a first mode to a second mode according to the mode control command; obtaining voice information of a user when the terminal device is in the second mode; obtaining, according to the voice information, target information required by the user from a server; and playing audio information corresponding to the target information.

Optionally, the processor 142 is specifically used for at least one of the following operations when obtaining the mode control command: detecting an operation from the user on an application in the terminal device, and generating the mode control command according to the operation; and detecting whether the terminal device is connected to an external device, and generating the mode control command if the terminal device is connected to the external device.

Optionally, the external device includes at least one of: a charging base, a speaker, a headphone, and a mobile phone holder.

Optionally, the processor 142 is specifically configured to collect the voice information of the user via the external device when obtaining the voice information of the user; and the processor 142 is specifically configured to play the audio information corresponding to the target information via the external device when playing the audio information corresponding to the target information.

Optionally, the terminal device includes a near-field voice channel and a far-field voice channel; when converting the terminal device from the first mode to the second mode, the processor 142 is specifically configured to deactivate the near-field voice channel and activate the far-field voice channel; and when obtaining, according to the voice information, the target information required by the user from the server, the processor 142 is specifically configured to: process the voice information via the far-field voice channel, and determine the target information required by the user; and obtain the target information required by the user from the server.

Optionally, the processor 142 is further configured to: when the terminal device is in the first mode, control the terminal device to display a first interface; and when the terminal device is converted from the first mode to the second mode, control the terminal device to display a second interface.

Optionally, the processor 142 is further configured to: obtain an application control command, where the application control command is used to control an application which is not triggered by the user to be enabled or disabled; if the application control command is used to control an application which is not triggered by the user to be enabled, display, on the second interface, a user interface corresponding to the application when the terminal device is in the second mode and the application is enabled; and if the application control command is used to control an application which is not triggered by the user to be disabled, not display, on the second interface, a user interface corresponding to the application when the terminal device is in the second mode and the application is enabled.

Optionally, the processor 142 is further configured to: receive, via the communication interface 143, a push message transmitted in real time by the server when the terminal device is in the second mode; and display the push message on the terminal device.

The terminal device in the embodiment shown in FIG. 14 may be used to implement the technical solution in the foregoing method embodiment and implementation principles and technical effects thereof are similar, for which details will be omitted herein.

Figure 15:
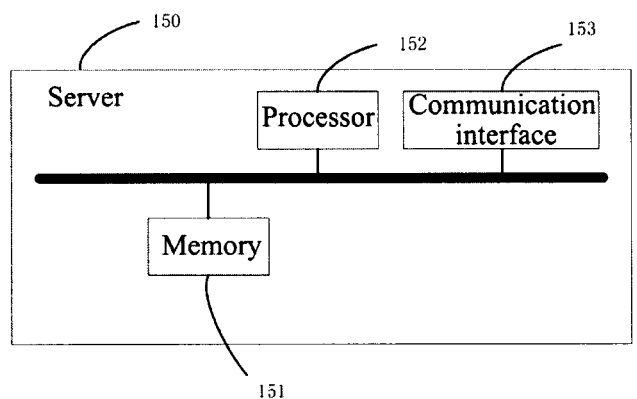
FIG. 15 is a schematic structural diagram of a server according to an embodiment of the present disclosure.

FIG. 15 is a schematic structural diagram of a server according to an embodiment of the present disclosure. The server may be specifically the remote server described in the above embodiments. The server provided in the embodiment of the present disclosure may perform a process flow provided in a voice interaction method embodiment. As shown in FIG. 15, the server 150 includes: a memory 151, a processor 152, a computer program, and a communication interface 153; where the computer program is stored in the memory 151 and configured to cause the processor 152 to perform operations of: obtaining a current voice interaction mode of a terminal device, where the terminal device includes a first mode and a second mode; if the terminal device is in the second mode, determining, according to voice information of a user transmitted by the terminal device, target information required by the user; and transmitting the target information to the terminal device via the communication interface 153 so that the terminal device plays audio information corresponding to the target information.

Optionally, the processor 152 is further configured to: generate a push message if the terminal device is in the second mode; and transmit, via the communication interface, the push message to the terminal device in real time.

Optionally, the processor 152 is specifically configured to perform the following operations when generating the push message: generating the push message according to at least one of the latest real-time hotspot information, user history information, and user a portrait.

Optionally, the processor 152 is specifically configured to perform the following operations when generating the push message according to at least one of the latest real-time hotspot information, the user history information, and the user portrait: predicting user behavior information according to the user history information; obtaining recommended contents according to the user behavior information; and determining the push message according to the recommended contents and the latest real-time hotspot information.

Optionally, the processor 152 is specifically configured to perform the following operations when determining the push message according to the recommended contents and the latest real-time hotspot information: sorting the recommended contents and the latest real-time hotspot information, and obtaining a sorting result of the recommended contents and the latest real-time hotspot information; and determining the push message according to the sorting result.

The server in the embodiment shown in FIG. 15 may be used to implement the technical solution in the foregoing method embodiment, and implementation principles and technical effects thereof are similar, for which details will be omitted herein.

In addition, the present embodiment further provides a computer readable storage medium having a computer program stored thereon, where the computer program is executed by the processor to implement the voice interaction method described in the foregoing embodiments.

Figure 16:
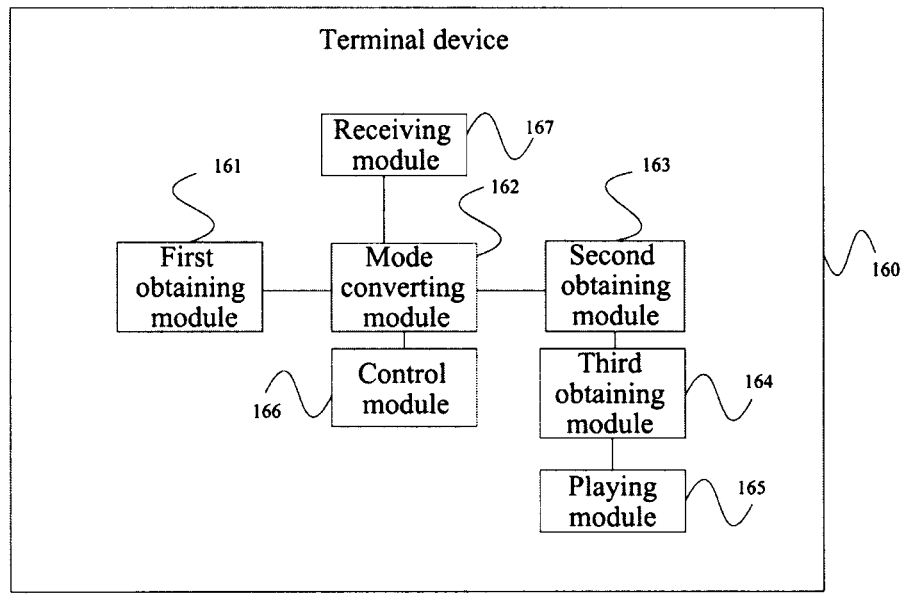
FIG. 16 is a schematic structural diagram of a terminal device according to an embodiment of the present disclosure.

FIG. 16 is a schematic structural diagram of a terminal device according to an embodiment of the present disclosure. The terminal device provided in the embodiment of the present disclosure may perform a process flow provided in a voice interaction method embodiment. As shown in FIG. 16, the terminal device 160 includes: a first obtaining module 161, a mode converting module 162, a second obtaining module 163, a third obtaining module 164 and a playing module 165, where the first obtaining module 161 is configured to obtain a mode control command; the mode converting module 162 is configured to convert a terminal device from a first mode to a second mode according to the mode control command; the second obtaining module 163 is configured to obtain voice information of a user when the terminal device is in the second mode; the third obtaining module 164 is configured to obtain, according to the voice information, target information required by the user from a server; and the playing module 165 is configured to play audio information corresponding to the target information.

Optionally, the first obtaining module 161 is specifically used for at least one of the following operations when obtaining the mode control command:

detecting an operation from the user on an application in the terminal device, and generating the mode control command according to the operation; and detecting whether the terminal device is connected to an external device, and generating the mode control command if the terminal device is connected to the external device.

Optionally, the external device includes at least one of: a charging base, a speaker, a headphone, and a mobile phone holder.

Optionally, the second obtaining module 163 is specifically configured to collect the voice information of the user via the external device when obtaining the voice information of the user; and the playing module 165 is specifically configured to play the audio information corresponding to the target information via the external device when playing the audio information corresponding to the target information.

Optionally, the terminal device includes a near-field voice channel and a far-field voice channel; when converting the terminal device from the first mode to the second mode, the mode converting module 162 is specifically configured to deactivate the near-field voice channel and activate the far-field voice channel; and when obtaining, according to the voice information, the target information required by the user from the server, the third obtaining module 164 is specifically configured to: process the voice information via the far-field voice channel, and determine the target information required by the user; and obtain the target information required by the user from the server.

Optionally, the terminal device further includes a control module 166, where the control module 166 is configured to: when the terminal device is in the first mode, control the terminal device to display a first interface; and when the terminal device is converted from the first mode to the second mode, control the terminal device to display a second interface.

Optionally, the first obtaining module 161 is further configured to: obtain an application control command, where the application control command is used to control an application which is not triggered by the user to be enabled or disabled; if the application control command is used to control an application which is not triggered by the user to be enabled, display, on the second interface, a user interface corresponding to the application when the terminal device is in the second mode and the application is enabled; and if the application control command is used to control an application which is not triggered by the user to be disabled, not display, on the second interface, a user interface corresponding to the application when the terminal device is in the second mode and the application is enabled.

Optionally, the terminal device further includes a receiving module 167, where the receiving module 167 is further configured to: receive, via the communication interface 143, a push message transmitted in real time by the server when the terminal device is in the second mode; and display the push message on the terminal device.

The terminal device in the embodiment shown in FIG. 16 may be used to implement the technical solution in the foregoing method embodiment and implementation principles and technical effects thereof are similar, for which details will be omitted herein.

Figure 17:
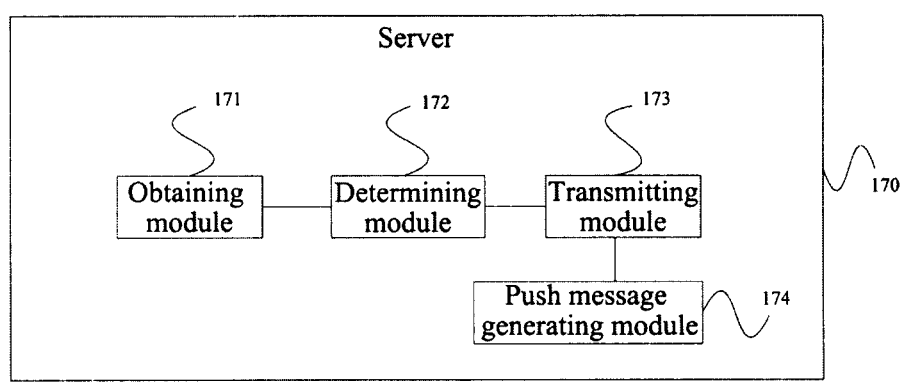
FIG. 17 is a schematic structural diagram of a server according to an embodiment of the present disclosure.

FIG. 17 is a schematic structural diagram of a server according to an embodiment of the present disclosure. The server may specifically be the remote server described in the forgoing embodiments. The server provided in the embodiment of the present disclosure may perform a process flow provided in a voice interaction method embodiment. As shown in FIG. 17, the server 170 includes: an obtaining module 171, a determining module 172, and a transmitting module 173, where the obtaining module 171 is configured to obtain a current voice interaction mode of a terminal device, where the terminal device includes a first mode and a second mode; the determining module 172 is configured to: when the terminal device is in the second mode, determine, according to voice information of a user transmitted by the terminal device, target information required by the user; and the transmitting module 173 is configured to transmit the target information to the terminal device so that the terminal device plays audio information corresponding to the target information.

Optionally, the server further includes a push message generating module 174, where the push message generating module 174 is configured to: generate a push message when the terminal device is in the second mode; and the transmitting module 173 is further configured to transmit the push message to the terminal device in real time. In the present embodiment, the push message generating module 174 may specifically include the user behavior analyzing module, the smart behavior predicting module, the sorting and processing module, and the operation analyzing module as shown in FIG. 13, and specific principles will be omitted herein.

Optionally, the push message generating module 174 is specifically configured to perform the following operations when generating the push message: generating the push message according to at least one of the latest real-time hotspot information, user history information, and user a portrait:

Optionally, the push message generating module 174 is specifically configured to perform the following operations when generating the push message according to at least one of the latest real-time hotspot information, the user history information, and the user portrait: predicting user behavior information according to the user history information; obtaining recommended contents according to the user behavior information; and determining the push message according to the recommended contents and the latest real-time hotspot information.

Optionally, the push message generating module 174 is specifically configured to perform the following operations when determining the push message according to the recommended contents and the latest real-time hotspot information: sorting the recommended contents and the latest real-time hotspot information, and obtaining a sorting result of the recommended contents and the latest real-time hotspot information; and determining the push message according to the sorting result.

The server in the embodiment shown in FIG. 17 may be used to implement the technical solution in the foregoing method embodiments, and implementation principles and technical effects thereof are similar, for which details will be omitted herein.

In several embodiments provided in the present disclosure, it should be understood that the disclosed devices and methods may be implemented in other manners. For instance, the described device embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented via some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the embodiments.

In addition, functional units in the embodiments of the present disclosure may be integrated into one processing unit, or each of the units may exist alone physically, or two or more units are integrated into one unit. The above integrated unit may be implemented in a form of hardware or in a form of hardware plus software functional units.

The integrated unit implemented in the form of a software functional unit as described above may be stored in a computer readable storage medium. The software functional unit is stored in a storage medium, and includes several commands for enabling a computer device (which may be a personal computer, a server, or a network device, etc.) or a processor to perform a part of steps of the method described in the embodiments of the present disclosure. The foregoing storage medium includes: any medium that can store program codes, such as a USB flash disk, a mobile hard disk, a Read-Only Memory (ROM), a Random Access Memory (RAM), a magnetic disk, or an optical disc, etc.

It may be clearly understood by persons skilled in the art that, for the purpose of convenient and brief description, division of the described functional modules is merely described for illustrations, in practical use, the described functions may be assigned as desired to different functional modules for implementations, that is, the internal structure of the device is divided into different functional modules to implement all or a part of functions as described above. For a detailed working process of the described devices, reference may be made to corresponding processes in the foregoing method embodiments, for which details will be omitted herein.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A voice interaction method, comprising:
   obtaining a mode control command;
   converting a terminal device from a first mode to a second mode according to the mode control command;
   obtaining voice information of a user when the terminal device is in the second mode;
   obtaining, according to the voice information, target information required by the user from a server; and
   playing audio information corresponding to the target information;
   receiving a push message transmitted in real time by the server when the terminal device is in the second mode; and
   displaying the push message on the terminal device;
   the push message is generated by the server according to at least one of a latest real-time hotspot information, user history information, and a user portrait;
   wherein the first mode comprises a near-field voice interaction mode, and the second mode comprises a far-field voice interaction mode.

2. The method according to claim 1, wherein the obtaining the mode control command comprises at least one of:
   detecting an operation from the user on an application in the terminal device, and generating the mode control command according to the operation; and
   detecting whether the terminal device is connected to an external device, and generating the mode control command if the terminal device is connected to the external device.

3. The method according to claim 2, wherein the obtaining the voice information of the user comprises:
   collecting the voice information of the user via the external device;
   the playing the audio information corresponding to the target information comprises:
   playing the audio information corresponding to the target information via the external device.

4. The method according to claim 1, wherein the terminal device comprises a near-field voice channel and a far-field voice channel;
   the converting the terminal device from the first mode to the second mode comprises:
   deactivating the near-field voice channel and activating the far-field voice channel;
   the obtaining, according to the voice information, the target information required by the user from the server comprises:
   processing the voice information via the far-field voice channel and determining the target information required by the user; and
   obtaining the target information required by the user from the server.

5. The method according to claim 1, further comprising:
   when the terminal device is in the first mode, controlling the terminal device to display a first interface; and
   when the terminal device is converted from the first mode to the second mode, controlling the terminal device to display a second interface.

6. The method according to claim 5, further comprising:
   obtaining an application control command, wherein the application control command is used to control an application which is not triggered by the user to be enabled or disabled;
   if the application control command is used to control an application which is not triggered by the user to be enabled, displaying, on the second interface, a user interface corresponding to the application when the terminal device is in the second mode and the application is enabled; and if the application control command is used to control an application which is not triggered by the user to be disabled, not displaying, on the second interface, a user interface corresponding to the application when the terminal device is in the second mode and the application is enabled.

7. A terminal device, comprising:
a non-transitory memory;
a processor; and
a computer program;
wherein the computer program is stored in the non-transitory memory and executed by the processor to perform operations of:
obtaining a mode control command;
converting a terminal device from a first mode to a second mode according to the mode control command;
obtaining voice information of a user when the terminal device is in the second mode;
obtaining, according to the voice information, target information required by the user from a server; and
playing audio information corresponding to the target information;
the terminal device further comprises a communication interface;
the computer program is executed by the processor to:
receive, via the communication interface, a push message transmitted in real time by the server when the terminal device is in the second mode; and
display the push message on the terminal device;
the push message is generated by the server according to at least one of a latest real-time hotspot information, user history information, and a user portrait;
wherein the first mode comprises a near-field voice interaction mode, and the second mode comprises a far-field voice interaction mode.

8. The terminal device according to claim 7, wherein the processor is specifically used for at least one of the following operations when obtaining the mode control command:
detecting an operation from the user on an application in the terminal device, and generating the mode control command according to the operation; and
detecting whether the terminal device is connected to an external device, and generating the mode control command if the terminal device is connected to the external device.

9. The terminal device according to claim 7, wherein the computer program is executed by the processor to collect the voice information of the user via an external device when obtaining the voice information of the user; and
the processor is specifically configured to play the audio information corresponding to the target information via the external device when playing the audio information corresponding to the target information.

10. The terminal device according to claim 7, wherein the terminal device comprises a near-field voice channel and a far-field voice channel;
when converting the terminal device from the first mode to the second mode, the computer program is executed by the processor to deactivate the near-field voice channel and activate the far-field voice channel; and
when obtaining, according to the voice information, the target information required by the user from the server, the processor is specifically configured to:
process the voice information via the far-field voice channel, and determine the target information required by the user; and obtain the target information required by the user from the server.

11. The terminal device according to claim 7, wherein the computer program is executed by the processor to:
when the terminal device is in the first mode, control the terminal device to display a first interface; and
when the terminal device is converted from the first mode to the second mode, control the terminal device to display a second interface.

12. The terminal device according to claim 11, wherein the computer program is executed by the processor to:
obtain an application control command, wherein the application control command is used to control an application which is not triggered by the user to be enabled or disabled;
if the application control command is used to control an application which is not triggered by the user to be enabled, display, on the second interface, a user interface corresponding to the application when the terminal device is in the second mode and the application is enabled; and
if the application control command is used to control an application which is not triggered by the user to be disabled, not display, on the second interface, a user interface corresponding to the application when the terminal device is in the second mode and the application is enabled.

13. A server, comprising:
a non-transitory memory;
a processor;
a communication interface; and
a computer program;
wherein the computer program is stored in the non-transitory memory and executed by the processor to perform operations of:
obtaining a current voice interaction mode of a terminal device, wherein the terminal device comprises a first mode and a second mode;
if the terminal device is in the second mode, determining, according to voice information of a user transmitted by the terminal device, target information required by the user; and
transmitting the target information to the terminal device via the communication interface so that the terminal device plays audio information corresponding to the target information;
wherein the computer program is executed by the processor to:
generate a push message if the terminal device is in the second mode; and
transmit, via the communication interface, the push message to the terminal device in real time;
wherein the computer program is executed by the processor to perform the following operations when generating the push message:
generating the push message according to at least one of a latest real-time hotspot information, user history information, and a user portrait;
wherein the first mode comprises a near-field voice interaction mode, and the second mode comprises a far-field voice interaction mode.

14. The server according to claim 13, wherein the computer program is executed by the processor to perform the following operations when generating the push message according to at least one of the latest real-time hotspot information, the user history information, and the user portrait:

predicting user behavior information according to the user history information;

obtaining recommended contents according to the user behavior information; and determining the push message according to the recommended contents and the latest real-time hotspot information.

15. The server according to claim 14, wherein the computer program is executed by the processor to perform the following operations when determining the push message according to the recommended contents and the latest real-time hotspot information:

sorting the recommended contents and the latest real-time hotspot information, and obtaining a sorting result of the recommended contents and the latest real-time hotspot information; and determining the push message according to the sorting result.

16. A non-transitory computer readable storage medium having a computer program stored thereon, wherein the computer program is executed by a processor to implement a method according to claim 1.

* * * * *